United States Patent [19]

Karayannis et al.

[11] 4,276,191
[45] Jun. 30, 1981

[54] CATALYST AND PROCESS FOR POLYMERIZATION OF ALPHA-OLEFINS

[75] Inventors: Nicholas M. Karayannis; Harold Grams, both of Naperville; John S. Skryantz, Lisle, all of Ill.

[73] Assignee: Standard Oil Company (Indiana), Chicago, Ill.

[21] Appl. No.: 45,110

[22] Filed: Jun. 4, 1979

[51] Int. Cl.³ ............................................. C08F 4/64
[52] U.S. Cl. ............................ 252/429 C; 252/431 R; 526/151
[58] Field of Search ........................ 252/429 C, 431 R

[56] References Cited

U.S. PATENT DOCUMENTS

| 3,101,328 | 8/1963 | Edmonds | 252/429 B X |
|---|---|---|---|
| 3,179,601 | 4/1965 | Kummer | 252/441 |
| 3,316,314 | 4/1967 | van den Berg | 252/429 C X |
| 3,737,393 | 6/1973 | de Vries | 252/431 R |
| 3,784,481 | 1/1974 | Lassau et al. | 252/429 C X |
| 3,801,558 | 4/1974 | Fletcher et al. | 252/429 B X |
| 3,933,934 | 1/1976 | Bailly et al. | 252/429 C X |
| 3,951,935 | 4/1976 | Engelmann | 252/429 C X |
| 4,097,659 | 6/1978 | Creemers et al. | 252/429 C X |
| 4,128,501 | 12/1978 | Smith et al. | 252/429 C X |
| 4,135,046 | 1/1979 | Harris et al. | 252/431 R X |
| 4,136,058 | 1/1979 | Harris et al. | 252/429 C X |
| 4,163,831 | 8/1979 | Gessell | 252/429 C X |
| 4,172,050 | 10/1979 | Gesseu | 252/429 C X |

FOREIGN PATENT DOCUMENTS 977766 11/1975 Canada .
1492379 11/1977 United Kingdom .
1500873 2/1978 United Kingdom .

OTHER PUBLICATIONS

Texas Alkyls Research & Development Product Data Sheet Magala-2B.
Texas Alkyls Research & Development Product Data Sheet Magala-6E.

*Primary Examiner*—Patrick Garvin
*Attorney, Agent, or Firm*—Stephen L. Hensley; William T. McClain; William H. Magidson

[57] ABSTRACT

Catalyst and process for polymerization of alpha-olefins to predominantly atactic products, such catalyst comprising (A) an organoaluminum component and (B) a solid reaction product of (1) a titanium (IV) component and (2) a hydrocarbon-soluble organomagnesium-organoaluminum complex.

6 Claims, No Drawings

CATALYST AND PROCESS FOR POLYMERIZATION OF ALPHA-OLEFINS

BACKGROUND OF THE INVENTION

This invention relates to a catalyst and process for the polymerization of alpha-olefins, and more particularly, to a catalyst and process for the preparation of predominantly atactic polymers of alpha-olefins.

It is well known that atactic polymers of propylene and higher alpha-olefins are obtained as by-products in stereospecific polymerization operations and that the atactic and isotactic fractions of the total polymeric product can be separated due to different solubilities in hydrocarbon solvents. In typical slurry process stereospecific polymerization operations, the fraction of by-product atactic generally ranges up to about 10 wt.% of the total product and a number of uses for the atactic fraction have been developed; e.g., adhesives, waxes, artificial fireplace logs. However, in recent years, catalysts for the stereospecific polymerization of propylene and higher alpha-olefins have been improved to such an extent that the atactic fraction of the total product is so low that the same can be retained in the final product with only minor, if any, effects on the properties of the isotactic fraction. Given the greater commercial value of the isotactic fraction and the cost of separating isotactic and atactic fractions, there is little economic incentive to recover the atactic fraction in such operations. As commercial scale use of improved stereospecific catalysts increases, the supply of by-product atactic is likely to diminish and it may become difficult to fulfill the demand for atactic.

From the foregoing, it can be appreciated that a direct method for the preparation of atactic polyalpha-olefins would be desirable. It is an object of this invention to provide such a method. A further object of the invention is to provide a catalyst and process for the polymerization of alpha-olefins to predominantly atactic polymeric products. Other objects of the invention will be apparent from the following description.

We have now found that the foregoing objects can be attained according to the present invention wherein there is provided a catalyst for the polymerization of alpha-olefins to predominantly atactic products comprising (A) an organoaluminum component and (B) a second component which is the solid reaction product of components consisting essentially of (1) a titanium-(IV) halide or alkoxyhalide and (2) a hydrocarbon-soluble organomagnesium-organoaluminum complex. According to a further aspect of the invention, there is provided a process for the preparation of predominantly atactic polymers of alpha-olefins comprising contacting at least one alpha-olefin of three or more carbon atoms with the above-described catalyst in the presence of an inert liquid polymerization medium. The polymeric products obtained in accordance with the present invention are predominantly atactic as evidenced by their solubility in alkanes. Typically the products are at least about 70 wt.% soluble in hexane. Further, the activity of the invented catalysts is sufficiently high that predominantly atactic polyalpha-olefins can be obtained at economically attractive production rates. Additionally, the molecular weights and molecular weight distributions of the predominantly atactic products obtained in accordance with this invention typically are at least comparable to those of by-product atactic produced in conventional slurry process isotactic polymerization operations, and accordingly the former are well suited for use in typical by-product atactic applications.

It is well known to polymerize alpha-olefins in the presence of catalytic mixtures of organoaluminum compounds with titanium(IV) compounds or with products obtained by reaction of titanium(IV) compounds with organometallic compounds; and organomagnesium-organoaluminum complexes of the type employed according to the present invention have been disclosed to be useful as "a cocatalyst for Ziegler-Natta systems." See Texas Alkyls Research and Development, Product Data Sheet "MAGALA-2B" and "MAGALA-6E," and U.S. Pat. No. 3,737,393 (de Vries), U.S. Pat. No. 4,128,501 (Smith et al.), and Canadian Pat. No. 977,766 (Texas Alkyls). However, such catalysts typically are useful in the production of polyethylene or predominantly isotactic polymers of propylene and higher alpha-olefins. For example, Example 8 of the aforesaid Canadian Pat. No. 977,766 illustrates polymerization of propylene using a catalytic mixture of titanium tetrachloride, an approximately 1.7:1 complex of di-n-butylmagnesium and triethylaluminum, and ethylaluminum sesquichloride to a product having an isotactic index of 93 percent. Accordingly, it was unexpected that predominantly atactic products would be obtained through the use of the catalysts of this invention.

Other prior art which may be of interest to the present invention in disclosing the use of organomagnesium-organoaluminum complexes in preparation of alpha-olefin polymerization catalyst components include the following.

British Pat. No. 1,492,379 (Dow) discloses alpha-olefin polymerization catalysts comprising (A) the reaction product of (1) an ester of titanium(III) or (IV) with (2) an intermediate reaction product of (a) an organomagnesium compound, including hydrocarbon-soluble complexes of dialkylmagnesiums with trialkylaluminums and (b) a metallic halide such as a dialkylaluminum halide or alkylaluminum dihalide; or (B) the reaction product of (1) the intermediate reaction product of (a) the titanium ester with (b) the organomagnesium component, and (2) the metallic halide. In the polymerization of alpha-olefins, the disclosed catalysts can be employed alone or "in combination with a common Ziegler catalyst activator such as an organoaluminum compound." According to the patentee, the disclosed catalysts are useful primarily in the polymerization of ethylene.

British Pat. No. 1,500,873 (Dow) discloses alpha-olefin polymerization catalysts comprising (1) an aluminum alkyl component and (2) a component which is the reaction product of (a) a transition metal compound, including titanium halides and alkoxides, (b) a hydrocarbon-soluble organomagnesium compound or complex thereof with another organometallic such as a trialkylaluminum, and (c) a hydrogen halide or organic halide. According to the patentee, the disclosed catalysts give best results in the polymerization of ethylene.

U.S. Pat. No. 4,135,046 (Harris et al.) discloses an ethylene polymerization catalyst prepared by reducing tetrabutyl titanate with a 1:2 complex of a dialkylmagnesium and a trialkylaluminum followed by deactivating excess dialkylmagnesium with hydrogen chloride and then adding a second increment of tetrabutyl titanate. For use in the polymerization of ethylene, the resulting catalyst is employed without addition of an aluminum alkyl component.

Although the foregoing patents disclose the use of titanium(IV) compounds and organomagnesium-organoaluminum complexes in preparation of alpha-olefin polymerization catalyst components, each of the patents also requires the use of an alkylaluminum halide or a nonmetallic halide in preparation. In contrast, the solid component of the catalysts of the present invention is prepared without the use of such materials. Further, the catalysts disclosed in the aforesaid patents are primarily useful in the polymerization of ethylene. As a general rule, typical ethylene polymerization catalysts are of little use in operations for either stereospecific or atactic polymerization of propylene and higher alpha-olefins due to relatively low activities and because the atactic and isotactic fractions resulting from such operations often are relatively close.

The following patents, although not directed to the use of organomagnesium-organoaluminum complexes in preparation of alpha-olefin polymerization catalyst components and/or catalysts, may be of interest to the present invention in disclosing the use of magnesium and/or various compounds thereof in preparation of catalyst components, and/or catalysts for the production of atactic polyalpha-olefins.

U.S. Pat. No. 3,933,934 (Bailly et al.) discloses catalysts for the production of atactic polyalpha-olefin waxes comprising (1) a Group II or III organometallic such as an aluminum alkyl and (2) the solid product obtained by reacting (a) a titanium halide, alkoxide, or alkoxyhalide, (b) metallic magnesium, and (c) an alkyl halide. Polymerization of alpha-olefins in the presence of the disclosed catalysts is reported to result in high yields of predominantly atactic polyalpha-olefins as evidenced by their solubility in alkanes (at least about 95% soluble in boiling heptane). However, such catalysts are disadvantageous from the standpoint of preparative ease and economy because separation of the solid catalyst component from unreacted magnesium and removal of reaction by-products can be difficult.

U.S. Pat. No. 3,951,935 (Engelmann) discloses catalysts for the preparation of atactic polyalpha-olefins comprising (1) a hydrocarbylaluminum halide and (2) a component prepared from (a) titanium tetrachloride or a titanium tetraalkoxide, (b) a magnesium compound containing hydroxy or alkoxy groups, and optionally, (c) a silicon and/or aluminum chloride or alkoxide. Polymerization in the presence of the disclosed catalysts is conducted at 100° to 160° C., and in Example 1 it is reported that an atactic polypropylene fraction of 75 wt.% was obtained.

U.S. Pat. No. 3,101,328 (Edmonds, Jr.) discloses polymerization of alpha-olefins in the presence of a catalytic mixture of an organic halide, a Group IV metal halide such as titanium trichloride or titanium tetrachloride, and a Group I-III metal (e.g., magnesium) or mixture thereof. Polymer tacticity is not discussed.

U.S. Pat. No. 3,179,601 (Kummer) discloses a brown solid ethylene polymerization catalyst prepared by reaction of titanium tetrahalide vapors with magnesium vapors. Again, product tacticity is not discussed.

U.S. Pat. No. 3,801,558 (Fletcher et al.) discloses alpha-olefin polymerization catalysts comprising an organoaluminum component and a component prepared by reaction of titanium tetrachloride with a hydrocarbon soluble organomagnesium compound prepared by reacting metallic magnesium with an alkyl halide in the presence of a hydrocarbon solvent and a complexing agent. Again, product tacticity is not discussed.

DESCRIPTION OF THE INVENTION

Briefly, the catalysts of the present invention comprise (A) an organoaluminum component and (B) a component which is the solid reaction product of components consisting essentially of (1) a titanium(IV) halide or alkoxyhalide, and (2) a hydrocarbon soluble organomagnesium-organoaluminum complex. According to the process of this invention, at least one alpha-olefin of three or more carbon atoms is contacted with the catalyst under polymerizing conditions and in the presence of an inert liquid polymerization medium to form a predominantly atactic polymeric product which then is recovered.

In greater detail, the organoaluminum component (A) of the invented catalysts includes materials of the formula $AlR_gX_{3-g}$ wherein R is an alkyl radical of 1 to about 20 carbon atoms, X is halogen, and g ranges from 1 to 3. Mixtures also can be employed if desired. Preferred organoaluminum compounds are those wherein R in the formula is an alkyl radical of 2 to about 8 carbon atoms, X is chlorine, and g ranges from 1.5 to about 2.5 as these give best results in terms of activity and atactic fraction. Specific examples of preferred organoaluminum components include diethylaluminum chloride, diisobutylaluminum chloride, di-n-hexylaluminum chloride, ethylaluminum sesquichloride, and isobutylaluminum sesquichloride. From the standpoint of maximizing atactic fractions at maximum catalytic activity, the most preferred organoaluminum components are the dialkylaluminum chlorides containing 2 to about 8 carbon atoms per alkyl radical, best results being attained through the use of diethylaluminum chloride.

The second component of the invented catalyst is a solid reaction product of components consisting essentially of (1) at least one titanium(IV) compound and (2) at least one hydrocarbon-soluble organomagnesium-organoaluminum complex. Useful titanium(IV) components include the halides and alkoxyhalides having 1 to about 12 carbon atoms per alkoxy group. Mixtures can be employed if desired. Specific examples of useful titanium compounds include $TiCl_4$, $TiBr_4$, $Ti(OCH_3)_3Cl$, $Ti(OC_4H_9)_3Cl$, $Ti(OC_6H_{13})_2Cl_2$, $Ti(OC_8H_{17})_2Br_2$, and $Ti(OC_{12}H_{25})Cl_3$. Titanium tetrahalides, and especially $TiCl_4$, are the preferred titanium(IV) components as these give best results in terms of atactic fraction and catalytic activity.

The hydrocarbon-soluble organomagnesium-organoaluminum complexes employed in preparation of the second component of the invented catalysts include hydrocarbon-soluble materials of the formula $(MgR^1_2)_m \cdot (AlR^2_3)_n$ wherein each $R^1$ and $R^2$ is independently an alkyl radical of 1 to about 20 carbon atoms, m and n are numbers greater than 0, and m/n is at least about 1. If desired, an ether or other suitable complexing agent can be employed to aid in solubilizing the organomagnesium-organoaluminum complex although the presence of such complexing agents may have adverse effects on catalytic activity. Preferred organomagnesium-organoaluminum complexes are hydrocarbon-soluble complexes wherein each $R^1$ and $R^2$ in the formula is independently an alkyl radical of 2 to about 8 carbon atoms such as ethyl, butyl, hexyl, and octyl and m/n ranges from about 1 to about 10 as these are relatively easy to obtain in soluble form and give good results in terms of atactic fraction and catalytic activity. Specific examples of such preferred materials include $[Mg(C_4H_9)_2]_6 \cdot [Al(C_2H_5)_3]$, $[Mg(C_4H_9)_2]_2 \cdot [Al(C_4H_9)_3]$, $[Mg(C_2H_5)_2]_5 \cdot [Al(C_2H_5)_3]_2$ and $[Mg(C_6H_{13})_2]_3 \cdot [Al(C_3H_7)_3]$. Best results are attained through the use of hydrocarbon-soluble di-n-butylmagnesium-triethylaluminum complexes wherein the molar ratio of di-n-butylmagnesium to triethylaluminum ranges from about 2:1 to about 8:1, and is most preferably about 6:1.

While not required, it is preferred to employ the organometallic complex in the form of a hydrocarbon solution to facilitate handling the component and to aid in dispersing heat evolved during the preparative reaction. Preferred solvents are alkanes such as hexane, heptane, octane, and so forth, although a wide variety of other materials also are useful. Specific examples of such other solvents include these materials useful as solvents during the preparation as set forth hereinbelow. The concentration of organometallic complex in the solvent is not critical from the standpoint of catalytic performance. Of course, the solution should not be so dilute as to require unreasonably large vessels for storage or the preparation nor should it be so concentrated as to create difficulties in handling.

The above-described hydrocarbon soluble organomagnesium-organoaluminum complexes are known materials and can be prepared by conventional methods. One such method involves simple addition of an appropriate trialkylaluminum to a solid dialkylmagnesium in the presence of an inert hydrocarbon solvent for the trialkylaluminum compound. Formation of a soluble organomagnesium-organoaluminum complex proceeds at reasonable rates at ambient temperature and can be accelerated by heating. Another convenient method for preparation of the soluble organomagnesium-organoaluminum complexes employed according to the present invention is disclosed in Canadian Pat. No. 977,766 and U.S. Pat. No. 3,737,393 which are incorporated herein by reference. According to these patents, metallic magnesium is reacted with an appropriate organic halide, preferably in the presence of a hydrocarbon solvent, with either concurrent or subsequent addition of an appropriate trialkylaluminum compound.

In preparation of the (B) component of the invented catalysts, the above-described titanium(IV) and hydrocarbon-soluble organomagnesium-organoaluminum components are employed in amounts such that the atomic ratio of magnesium plus aluminum in the complex to titanium ranges from about 0.5:1 to about 4:1. Preferably, this ratio ranges from about 0.5:1 to about 2:1 in order to ensure adequate reaction between the materials without waste of the organometallic complex. Best results are attained through the use of approximately equimolar amounts of the titanium(IV) and organometallic components.

Reaction between the titanium(IV) component and the organomagnesium-organoaluminum complex preferably is conducted in the presence of an inert solvent, although it also is contemplated to conduct the preparative reaction neat, i.e., in the absence of solvent, so long as provision is made for removing heat evolved during the reaction and handling of the neat reaction product. Suitable solvents include various hydrocarbons and halogenated hydrocarbons which are liquid at reaction temperatures and in which the organometallic complex is soluble. Specific examples of useful solvents include alkanes such as hexane, heptane, octane, and nonane; cycloalkanes such as cyclohexane; aromatics such as ethylbenzene and diethylbenzenes; and halogenated and hydrogenated aromatics such as chlorobenzene, o-dichlorobenzene, and tetrahydronaphthalene. For best results, it is desirable to purify the solvent prior to use such as by percolation through molecular sieves and/or silica gel to remove traces of water, oxygen, and polar compounds capable of adversely affecting catalytic performance. The amount of solvent to be used is not critical although the amount should be at least sufficient to provide adequate heat transfer away from the solid catalyst component which ultimately forms.

Reaction between the titanium(IV) component and the organometallic complex is conducted at temperatures ranging from about $-50°$ to about $150°$ C. and for a period of time sufficient to form a solid reaction product. Preferred temperatures range from about $-30°$ to about $60°$ C. as these are convenient and give good results in terms of catalytic activity and atactic fraction. Preferred reaction times range from several minutes to several hours and more preferably from about one-half to about 8 hours. It is desirable to agitate the components employed in the preparation during at least a portion of this period to ensure adequate reaction.

The preparation is conducted in the substantial absence of water, oxygen, oxides of carbon, and other extraneous materials capable of adversely affecting catalytic performance. However, as noted hereinabove, a minor amount of an ether or other complexing agent can be used to aid in solubilizing the organometallic complex. Extraneous catalyst poisons are conveniently excluded by carrying out the preparation under an atmosphere of an inert gas such as nitrogen or argon. As noted above, purification of any solvent to be employed during preparation also is useful in this regard.

As a result of the above-described preparation, there is obtained a solid reaction product. Preferably, the solid is separated from any solvent employed in the preparation and washed with an appropriate liquid to remove unreacted starting materials prior to polymerization use. Suitable wash liquids include those materials useful as solvents in the preparation.

Although the precise chemical structure and composition of the solid catalyst component are not presently known, the preparative reaction involves more than a simple redox reaction as evidenced by the fact that for a given amount of titanium(IV) component used as a starting material, the yield of solid catalyst component exceeds the theoretical yield of lower valent titanium compounds which would be obtained by reduction of titanium(IV).

For use in the polymerization of alpha-olefins to predominantly atactic polymeric products, the above-described solid catalyst component and organoaluminum component are combined to form active catalyst, at least one alpha-olefin of at least 3 carbon atoms is contacted with the catalyst in the presence of an inert liquid polymerization medium under polymerizing conditions, and predominantly atactic polymeric product is recovered.

The amount of solid component employed in polymerization is a catalytically effective amount and varies depending on reactor size and configuration, choice of monomer, and other known factors. The precise amount to be employed can be determined by persons of skill in the art based on the examples appearing hereinbelow. In the polymerization of propylene or propylene-dominated mixtures of alpha-olefins, it is preferred to employ from about 0.0005 to about 0.3 g. solid component per liter of total reactor volume.

The amount of organoaluminum component employed in polymerization varies depending on the amount of solid component employed, and in general, is at least an amount which is effective to promote the polymerization activity of the solid component. Preferably, at least about 0.5 parts by weight organoaluminum component are used per part by weight solid component. More preferably, the amount ranges from about 1 to about 10 parts per part solid component, although substantially greater amounts can be employed if desired and often give beneficial results due to scavenging of impurities which may be contained in the liquid used as a polymerization medium.

Active catalyst is formed by combining the organoaluminum and solid catalyst components. If desired, the components can be combined prior to introduction into the polymerization reactor or the components can be added to the reactor separately such that active catalyst is formed within the reactor.

The preferred alpha-olefin to be polymerized according to this invention is propylene. However, higher alpha-olefins such as butene-1, pentene-1, 4-methylpentene-1, hexene-1, and so forth also can be polymerized. It also is contemplated to polymerize mixtures of alpha-olefins wherein at least one of the components of the mixture contains 3 or more carbon atoms, such as mixtures of propylene with ethylene, propylene with 4-methylpentene-1, butene-1 with ethylene, and butene-1 with hexene-1. Preferred mixtures are propylene-dominated mixtures of propylene with ethylene.

Polymerization is conducted by contacting the invented catalyst with monomer in an inert liquid under polymerization conditions. Such conditions include polymerization temperature, time, and pressure, avoidance of contamination of catalyst, choice of polymerization medium, regulation of polymer molecular weights, and other conditions known to persons of skill in the art.

In general, polymerization is carried out at temperatures sufficiently high to ensure reasonable polymerization rates and avoid unduly long reactor residence times, but not so high as to damage the catalyst due to excessive reaction rates. Preferred temperatures range from about 0° to about 180° C. Within this range, the precise temperature to be employed varies somewhat depending upon desired product characteristics. Temperatures in the upper portion of the range are most preferred from the standpoint of maximizing catalytic activities and atactic fractions. However, as discussed in greater detail hereinbelow, higher temperatures also lead to products which are not well suited for certain applications due to relatively low molecular weights and narrow molecular weight distributions. From the standpoint of maximizing activity and atactic fraction at relatively high molecular weights, it is most preferred to conduct the polymerization at about 60° to about 100° C. Polymerization time varies depending on temperature, and generally ranges from ½ to several hours. Preferably, polymerization is conducted over a period of 1 to about 4 hours. In general, polymerization pressures are at least about atmospheric, with about 20 to about 600 psi being preferred.

Inert liquids suitable for use as polymerization media according to the present invention are materials which are substantially inert to the catalyst components and liquid at polymerization temperatures. One class of useful materials includes hydrocarbons and halogenated hydrocarbons in which the atactic product is soluble. Examples include alkanes such as pentane, hexane, octane, nonane, cyclohexane, and methylcyclohexane; alkylaromatics such as toluene, xylenes, ethylbenzene, isopropylbenzene, ethyl toluene, n-propyl-benzene, diethylbenzenes, and mono- and dialkylnaphthalenes; halogenated and hydrogenated aromatics such as chlorobenzene, chloronaphthalene, ortho-dichlorobenzene, tetrahydronaphthalene, decahydronaphthalene; high molecular weight liquid paraffins or mixtures thereof, and other well known materials. Among these, hexane is preferred. It also is contemplated to employ the atactic product itself as a polymerization medium although this requires polymerization temperatures sufficiently high to maintain the atactic product in a relatively fluid state to facilitate handling of the product. According to this aspect of the invention, preferred temperatures range from about 150° to about 180° C., with about 150° to about 170° C. being more preferred to guard against damaging the catalyst. As can be appreciated, this mode of operation can be advantageous from the standpoint of product recovery in that there is no need to separate the atactic product from a solvent; however, the increased viscosity of the product can be disadvantageous from the standpoint of handling, and the high polymerization temperatures required can lead to product molecular weights which are unsuitable for certain applications.

Polymerization according to the invention is carried out under conditions that exclude oxygen, water, carbon oxides, and other materials that act as catalyst poisons. Purging of the reactor prior to use with an inert gas such as nitrogen is helpful in this regard as is purification of the polymerization medium to be employed, for example, by percolation through molecular sieves and/or silica gel, or, as noted above, through the use of excess organoaluminum catalyst component to scavenge impurities.

During polymerization, product molecular weight can be regulated through the use of hydrogen and/or by varying polymerization temperature. Generally, higher hydrogen partial pressures and higher temperatures give lower molecular weights and narrower molecular weight distributions. The atactic products produced according to the present invention are well suited for use as adhesives, and for this purpose it is desirable to maximize molecular weights. Accordingly, polymerization preferably is conducted in the absence of hydrogen and at a sufficiently low temperature to obtain relatively high molecular weight products though not so low as to depress catalytic activities and atactic fractions. As noted hereinabove, polymerization temperatures most preferably range from about 60° to about 100° C. such that high yields of atactic products having relatively high molecular weights are obtained.

On completion of polymerization, or when it is desired to terminate polymerization, the invented catalysts can be contacted with water, alcohols or other active hydrogen-containing materials in a manner well known to persons of skill in the art.

The atactic fraction of the total polymerization product is obtained in the form of a solution in the polymerization medium when a solvent for atactic is used as the medium, or in the form of a relatively viscous melt when the product itself is used as the polymerization medium. In the latter case, product recovery is accomplished by simply cooling the melt, although in either case, if it is desired to separate by-product isotactic polymer from the desired atactic fraction, this can be accomplished by filtration, centrifugation, or by simply allowing solids to settle. When a solvent for atactic is used as a polymerization medium, the atactic and isotactic fractions can be separated as described above and then the atactic fraction can be recovered from the solvent by known techniques such as steam stripping, or distillation.

The products obtained according to the process of the present invention are predominantly atactic polyalpha-olefins, and typically at least about 70 wt.% soluble in hexane. The atactic fraction typically exhibits a relatively high molecular weight (e.g., up to about 1,000,000), although as indicated hereinabove, this can be varied through the use of hydrogen or by manipulation of polymerization temperature. Depending on molecular weight, the atactic products produced according to this invention are useful in common by-product atactic applications such as waxes, adhesives, artificial fireplace logs, and so forth.

The invention will be further understood in connection with the following examples, it being understood that the same are for purposes of illustration and not limitation.

EXAMPLE I

A catalyst component was prepared in a nitrogen-filled drybox according to the following procedure. Into a glass reactor equipped with mechanical stirrer were added 150 ml. hexane followed by 12.5 ml. titanium tetrachloride. The resulting mixture then was stirred and cooled to $-35°$ C. 60 ml. of a 25 wt.% solution of a 6:1 complex of di-n-butyl-magnesium and triethylaluminum (MAGALA-6E, manufactured by Texas Alkyls) in heptane then were added dropwise to the reactor over a period of 3 hours and with stirring. The resulting mixture then was stirred and allowed to warm to room temperature over about 1½ hour, after which it was heated, with stirring, to 40° C. over about ½ hour and maintained at this temperature for an additional ½ hour. There resulted a brown solid reaction product which was filtered, washed five times with 50 ml. portions of hexane, weighed, and then diluted with 144 ml. hexane. The yield of brown solid was approximately 27 g.

Although the chemical structure of the brown solid reaction product is unknown, the fact that approximately 27 g. solid were obtained indicates that the solid contains compounds of titanium bonded to or intimately associated with compounds of magnesium and/or aluminum in that the theoretical yield of $TiCl_3$ from 12.5 ml. $TiCl_4$ is about 17.5 g.

EXAMPLE II

Propylene was polymerized using the brown solid catalyst component from EXAMPLE I according to the following procedure. To a 450 ml. glass pressure bottle equipped with magnetic stirrer were added 200 ml. hexane followed by 1 ml. 25 wt.% diethylaluminum chloride (DEAC) in hexane and then an amount of the slurry of catalyst component from EXAMPLE I containing 0.0738 g. brown solid. The pressure bottle then was sealed, heated, and 40 psig propylene charged thereto. Propylene also was charged during the run to maintain a total pressure of 40 psi in the bottle throughout the run. After 2 hours, polymerization was terminated by opening the pressure bottle to the atmosphere. The contents of the bottle then were filtered to remove the hexane insoluble fraction. The hexane soluble fraction was recovered by heating the filtrate on a hot plate overnight to drive off the hexane. Both fractions were weighed and catalytic activity (grams atactic polypropylene per gram solid catalyst component per hour) and atactic fraction (wt.% soluble in hexane) were determined. Polymerization temperature, activity, and atactic fraction are reported in TABLE I.

TABLE I

| RUN NO.: | 1 | 2 |
|---|---|---|
| POLYMERIZATION TEMP. (°C.) | 70 | 80 |
| ACTIVITY (g./g./hour): | 94.6 | 126.1 |
| ATACTIC FRACTION (wt. %) | 82.8 | 90.1 |

The molecular weight distributions of the atactic polypropylene fractions obtained in EXAMPLE II were determined by gel permeation chromatography. Distributions, weight and number average molecular weights ($M_w$ and $M_n$ respectively), and $M_w/M_n$ are reported in TABLE II.

TABLE II

| | RUN NO. 1 | | RUN NO. 2 | |
|---|---|---|---|---|
| MW | Wt. % | Cumulative Wt. % | Wt. % | Cumulative Wt. % |
| 500 | 0.83 | 0.83 | 0.00 | 0.00 |
| 1,000 | 3.62 | 4.45 | 1.45 | 1.45 |
| 2,500 | 8.35 | 12.80 | 7.78 | 9.23 |
| 5,000 | 9.66 | 22.45 | 9.75 | 18.97 |
| 7,500 | 7.11 | 29.57 | 7.36 | 26.33 |
| 10,000 | 5.62 | 35.18 | 5.95 | 32.29 |
| 20,000 | 15.06 | 50.24 | 16.21 | 48.50 |
| 30,000 | 9.14 | 59.38 | 9.99 | 58.49 |
| 40,000 | 6.29 | 65.66 | 6.92 | 65.41 |
| 60,000 | 8.17 | 73.84 | 9.15 | 74.57 |
| 80,000 | 5.05 | 78.89 | 5.66 | 80.23 |
| 100,000 | 3.44 | 82.33 | 3.79 | 84.01 |
| 150,000 | 5.07 | 87.40 | 5.50 | 89.51 |
| 200,000 | 2.72 | 90.12 | 2.85 | 92.36 |
| 275,000 | 2.34 | 92.46 | 2.29 | 94.66 |
| 350,000 | 1.42 | 93.89 | 1.32 | 95.98 |
| 500,000 | 1.66 | 95.54 | 1.43 | 97.42 |
| 650,000 | 0.97 | 96.52 | 0.72 | 98.14 |
| 850,000 | 0.79 | 97.30 | 0.26 | 98.60 |
| 1,000,000 | 0.39 | 97.70 | 0.26 | 98.96 |
| 2,000,000 | 1.26 | 98.96 | 0.66 | 99.62 |
| 3,000,000 | 0.47 | 99.43 | 0.19 | 99.81 |
| 4,000,000 | 0.24 | 99.67 | 0.10 | 99.91 |
| 5,000,000 | 0.13 | 99.80 | 0.08 | 99.99 |
| 10,000,000 | 0.20 | 100.00 | 0.01 | 100.00 |
| $M_w$ | | 113,998 | | 77,089 |
| $M_n$ | | 4,978 | | 7,029 |
| $M_w/M_n$ | | 22.9 | | 11.0 |

For comparative purposes there are reported in TABLE III the molecular weight distributions, $M_w$, $M_n$, and $M_w/M_n$ of by-product atactic polypropylene produced in commercial scale slurry process stereospecific polymerization operations, one of which employed a catalyst consisting of aluminum reduced titanium trichloride (Stauffer AA), ethylaluminum dichloride (EADC), and an organosilicate component, and the other of which employed a catalyst consisting of aluminum reduced titanium trichloride (Stauffer AA), DEAC, an organometallic sulfide component, and an amine component.

TABLE III

| | TiCl₃EADC/TEOS | | TiCl₃/DEAC/BTS/COL | |
|---|---|---|---|---|
| MW | Wt. % | Cumulative Wt. % | Wt. % | Cumulative Wt. % |
| 500 | 0.00 | 0.00 | 0.10 | 0.10 |
| 1,000 | 0.66 | 0.66 | 4.66 | 4.77 |
| 2,500 | 7.57 | 8.23 | 9.67 | 14.44 |
| 5,000 | 13.36 | 21.59 | 15.85 | 30.29 |
| 7,500 | 9.86 | 31.45 | 10.89 | 41.18 |
| 10,000 | 7.34 | 38.80 | 8.04 | 49.22 |
| 20,000 | 17.23 | 56.03 | 19.01 | 68.23 |
| 30,000 | 8.69 | 64.72 | 9.75 | 77.98 |
| 40,000 | 5.17 | 69.89 | 5.85 | 83.83 |
| 60,000 | 5.90 | 75.79 | 6.43 | 90.26 |
| 80,000 | 3.43 | 79.22 | 3.31 | 93.57 |
| 100,000 | 2.35 | 81.58 | 1.91 | 95.47 |
| 150,000 | 3.95 | 85.53 | 2.28 | 97.75 |
| 200,000 | 2.62 | 88.14 | 0.92 | 98.66 |
| 275,000 | 2.78 | 90.92 | 0.65 | 99.32 |
| 350,000 | 2.01 | 92.93 | 0.31 | 99.63 |
| 500,000 | 2.65 | 95.57 | 0.29 | 99.92 |
| 650,000 | 1.51 | 97.08 | 0.08 | 100.00 |
| 850,000 | 1.10 | 98.18 | 0.00 | 100.00 |
| 1,000,000 | 0.48 | 98.66 | 0.00 | 100.00 |
| 2,000,000 | 1.10 | 99.77 | 0.00 | 100.00 |
| 3,000,000 | 0.22 | 99.99 | 0.00 | 100.00 |
| 4,000,000 | 0.01 | 100.00 | 0.00 | 100.00 |
| $M_w$ | | 88,263 | | 24,216 |
| $M_n$ | | 7,762 | | 4,431 |
| $M_w/M_n$ | | 12.2 | | 5.5 |

From TABLES II and III, it can be seen that the molecular weights and molecular weight distributions of the atactic products produced according to the present invention are generally comparable to those of typical commercial scale by-product atactic. Accordingly, the atactic products prepared in accordance with this invention are well suited for use in typical by-product atactic applications.

We claim:

1. An alpha-olefin polymerization catalyst comprising
    (a) at least one organoaluminum component of the formula $AlR_gX_{3-g}$ wherein R is an alkyl radical of 1 to about 20 carbon atoms, X is halogen, and g ranges from 1 to 3, and
    (b) at least one component which is the solid reaction product of components consisting essentially of (1) at least one titanium(IV) halide or alkoxyhalide, and (2) at least one hydrocarbon-soluble organomagnesium-organoaluminum complex of the formula $(MgR^1{}_2)_m \cdot (AlR^2{}_3)_n$ wherein each $R^1$ and $R^2$ is independently an alkyl radical of 1 to about 20 carbon atoms, m and n are numbers greater than 0, and m/n is at least about 1, said components (1) and (2) being reacted at a temperature ranging from about −50° to about 150° C. and in amounts such that the atomic ratio of magnesium plus aluminum in (2) to titanium in (1) ranges from about 0.5:1 to about 4:1 to form a solid reaction product followed by separation of unreacted starting materials from said solid reaction product.

2. The catalyst of claim 1 wherein said solid reaction product is prepared in the presence of an inert hydrocarbon or halogenated hydrocarbon solvent for (2).

3. The catalyst of claim 2 wherein (a) is a dialkylaluminum chloride having 2 to about 8 carbon atoms per alkyl radical.

4. The catalyst of claim 3 wherein the titanium(IV) component in (b) is titanium tetrachloride and the organomagnesium-organoaluminum complex in (b) is a hydrocarbon-soluble dialkylmagnesium-trialkylaluminum complex wherein each alkyl radical is independently a radical of 2 to about 8 carbon atoms and m/n ranges from about 1 to about 10.

5. The catalyst of claim 4 wherein the dialkylmagnesium-trialkylaluminum complex in (b) is a hydrocarbon soluble di-n-butylmagnesium-triethylaluminum complex wherein the atomic ratio of magnesium to aluminum is about 6:1.

6. The catalyst of claim 5 wherein (a) is diethylaluminum chloride.

* * * * *